Figure 1:
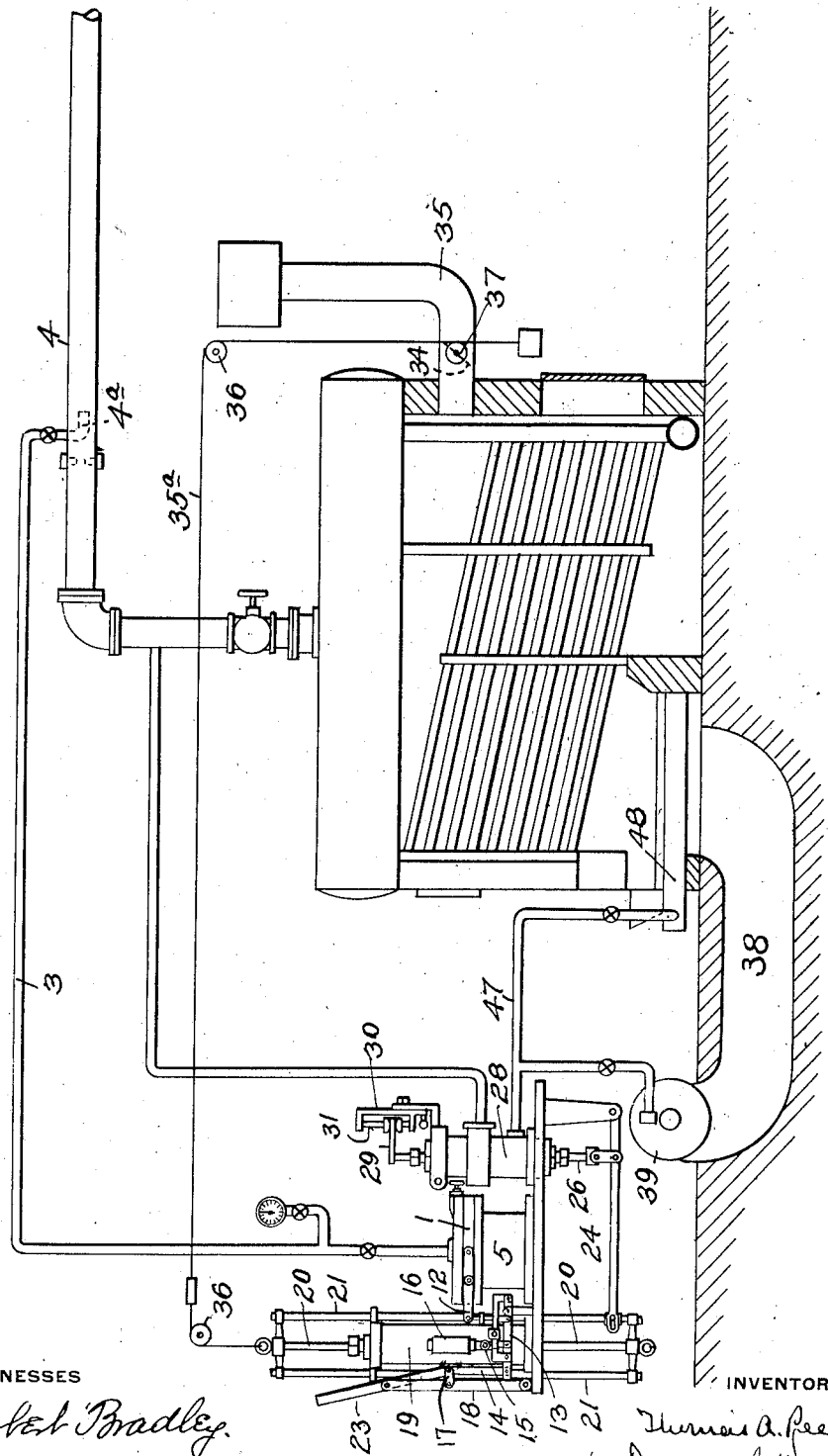

T. A. PEEBLES.
METHOD OF AND APPARATUS FOR REGULATING COMBUSTION.
APPLICATION FILED AUG. 13, 1918.

1,339,000.

Patented May 4, 1920.
6 SHEETS—SHEET 1.

WITNESSES
J. Herbert Bradley

INVENTOR
Thomas A. Peebles
by Demrie S. Wolcott
Atty

T. A. PEEBLES.
METHOD OF AND APPARATUS FOR REGULATING COMBUSTION.
APPLICATION FILED AUG. 13, 1918.
1,339,000.
Patented May 4, 1920.
6 SHEETS—SHEET 2.
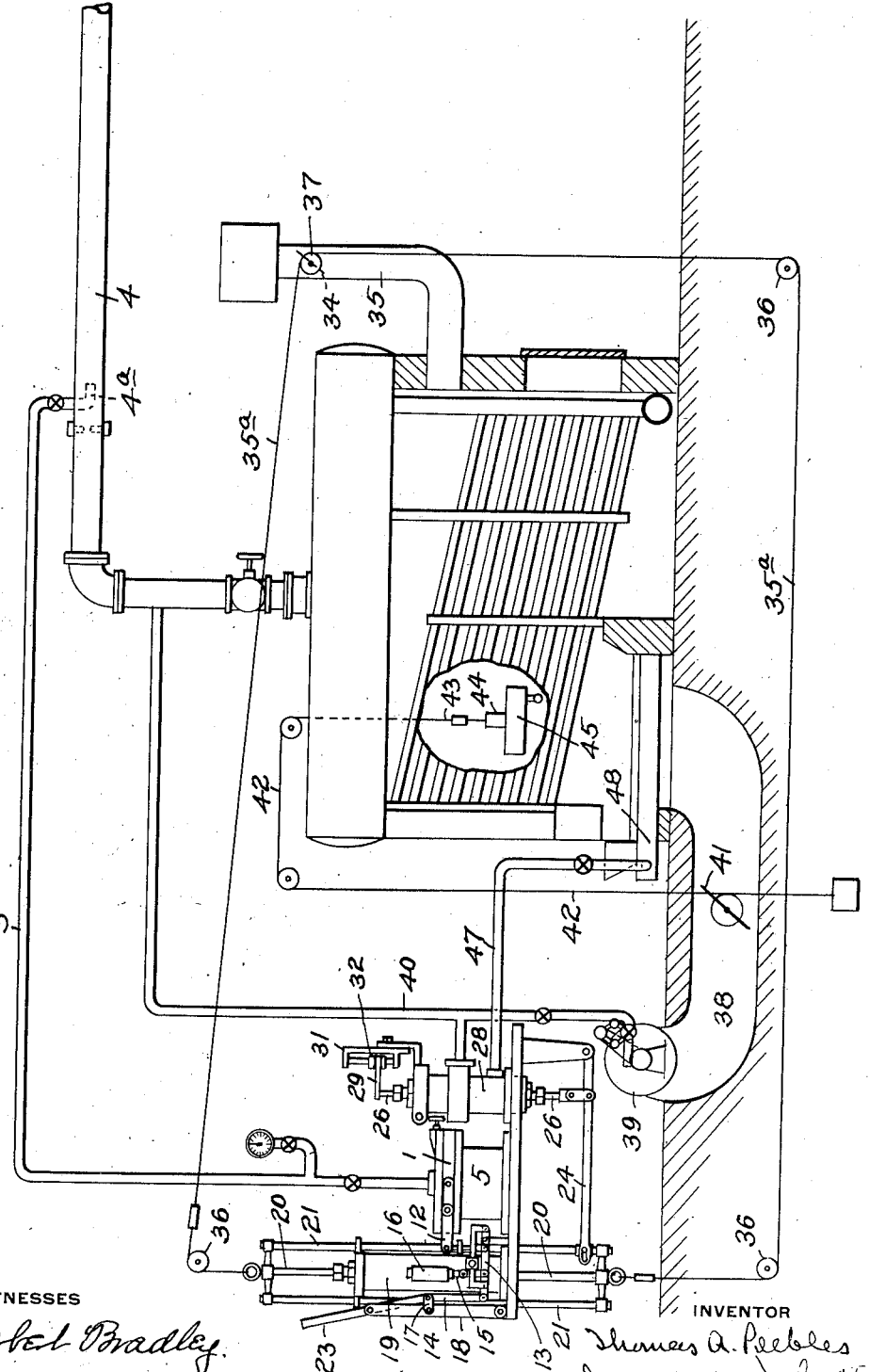

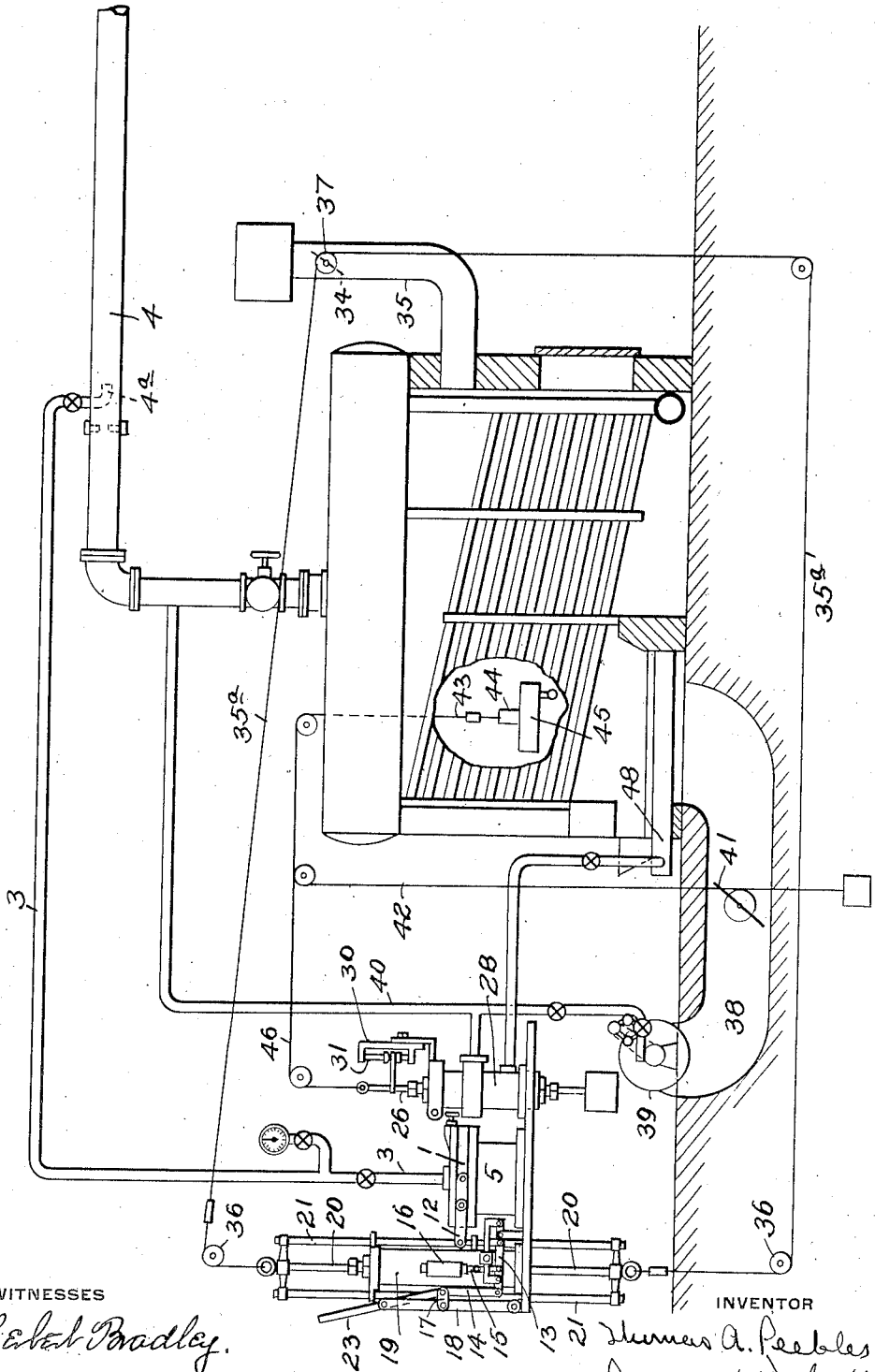

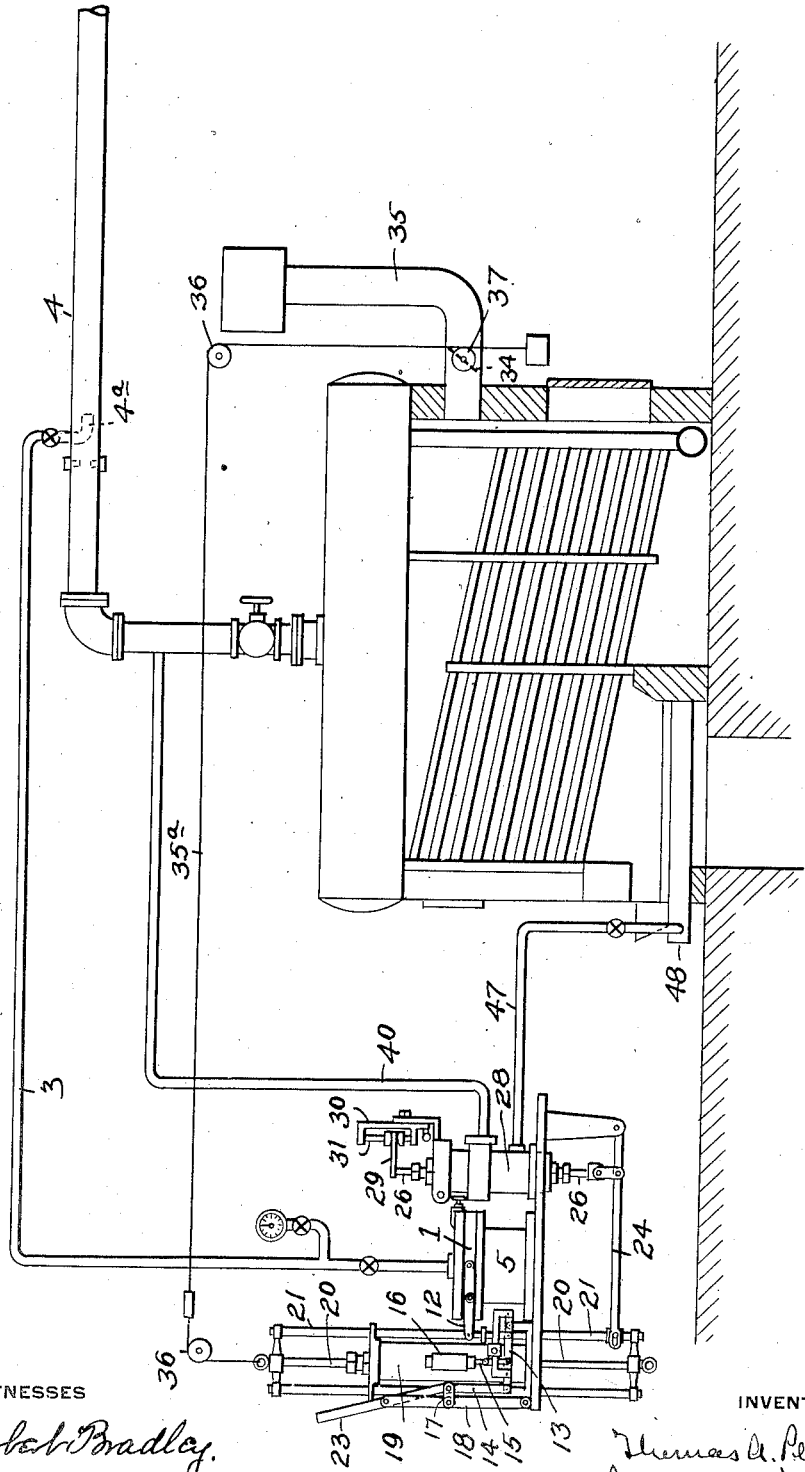

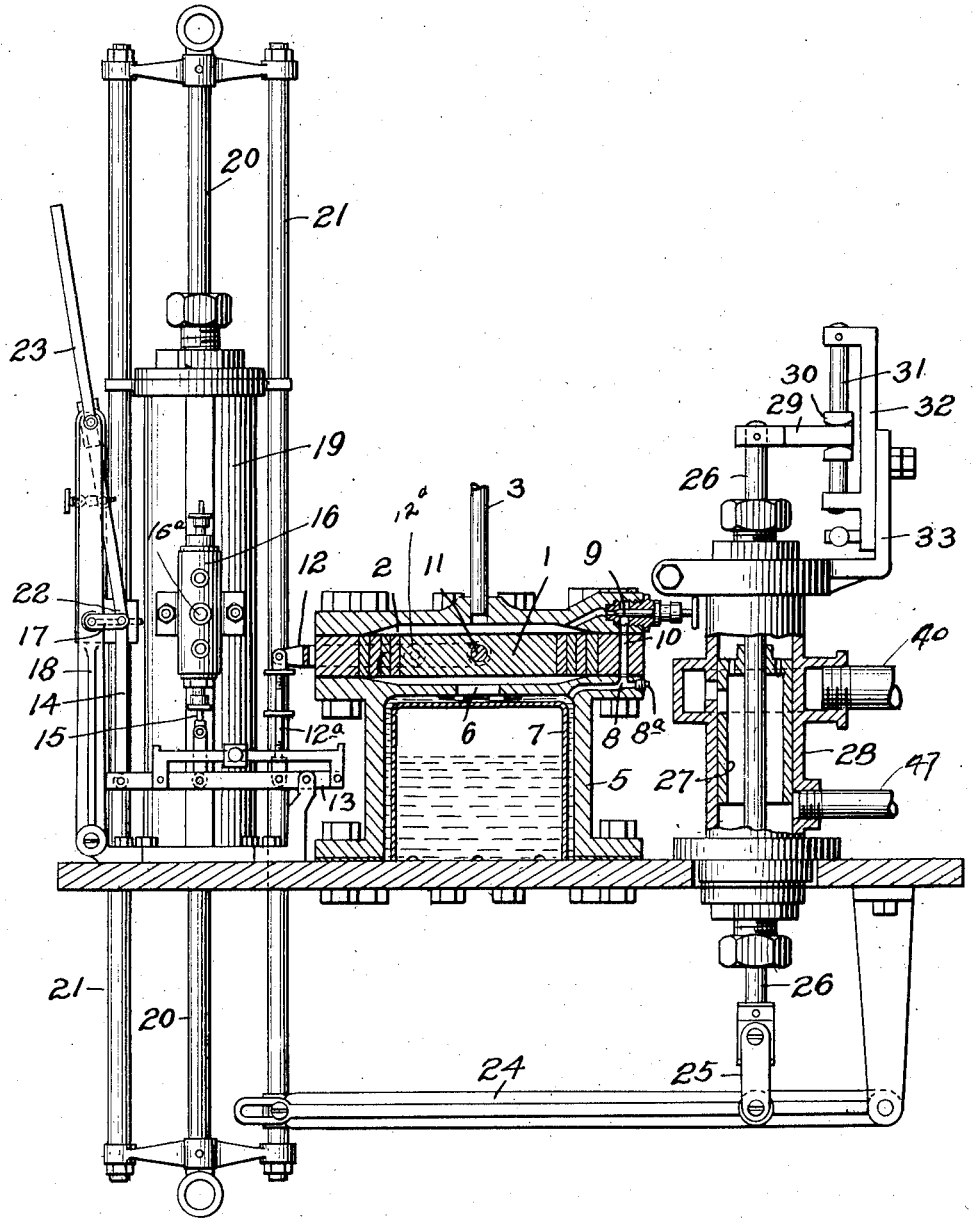

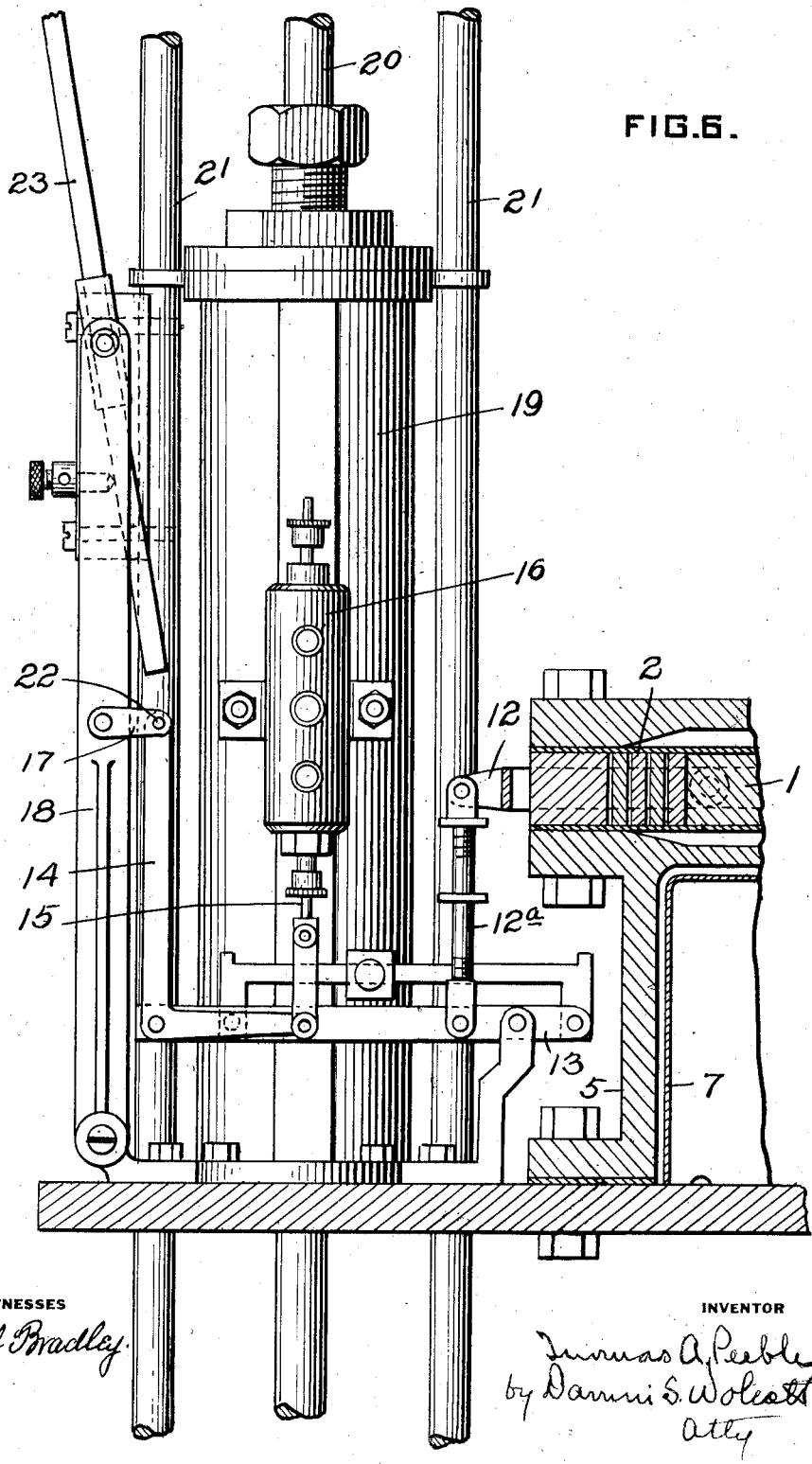

UNITED STATES PATENT OFFICE.

THOMAS A. PEEBLES, OF PITTSBURGH, PENNSYLVANIA, ASSIGNOR TO JOHN M. HOPWOOD, OF PITTSBURGH, PENNSYLVANIA.

METHOD OF AND APPARATUS FOR REGULATING COMBUSTION.

1,339,000.  Specification of Letters Patent.  Patented May 4, 1920.

Application filed August 13, 1918. Serial No. 249,654.

*To all whom it may concern:*

Be it known that I, THOMAS A. PEEBLES, residing at Pittsburgh, in the county of Allegheny and State of Pennsylvania, a citizen of the United States, have invented or discovered certain new and useful Improvements in Methods of and Apparatus for Regulating Combustion, of which improvement the following is a specification.

The invention described herein relates to certain improvements in the control or regulation of the rate of combustion of furnaces for boilers and has for its object the provision of means operative by and in accordance with the flow of steam to the point of use for regulating the feed of fuel, the flow of air to, and the escape of gases from the furnace, and also the regulation of the same operations by and in accordance with changes of pressure in the boiler. The invention is hereinafter more fully described and claimed.

In the accompanying drawings forming a part of this specification, Figure 1 is a diagrammatic view showing the boiler and its setting, the latter being in section and having combined therewith appliances suitable for the practice of the invention; Figs. 2, 3 and 4 are similar views illustrating modifications of the method of operation, Fig. 5 is a view partly in section and partly in elevation of the regulating mechanism, and Fig. 6 is a detail view illustrating a portion of the compensating mechanism.

In the practice of the invention it is preferred to employ the form of regulating mechanism shown in Fig. 5. As shown therein, the prime motor consists of a diaphragm 1 arranged in a shell or casing 2, preferably constructed as shown and described in Letters Patent No. 1,094,116, dated April 21, 1914, Francis H. Brown. The shell is so connected by a pipe 3 to the outlet pipe 4 of the boiler, as by a Pitot tube $4^a$, that one side of the diaphragm will be subjected to a pressure equal to the pressure in the boiler diminished or increased an amount proportional to the rate of flow of steam dependent on the arrangement of the Pitot tube $4^a$. The opposite side of the diaphragm is subjected to a fluid pressure equal to the normal working pressure of steam in the outlet pipe. This pressure is applied through a fluid cushion formed in a chamber 5 communicating with the under side of the shell or casing 2 through a port 6. An inverted cap 7 is arranged in the chamber which is then filled or partially filled with liquid through a port 8 which is then closed by a screw plug $8^a$. In thus filling the chamber, air will be trapped in the cup which rests on but does not form a tight joint with the bottom of the chamber, thereby forming a resilient cushion. To establish the desired pressure under the diaphragm, communication is established between the chambers on opposite sides of the diaphragm by opening the valve 9 in the passage 10. After an equalization of pressure on opposite sides of the diaphragm has been established, the valve 9 is closed so that thereafter one side of the diaphragm will be subjected to the pressure of the air cushion in the cup, such pressure being equal to the normal working pressure in the boiler minus an amount proportional to the normal rate of flow of steam through the outlet pipe 4. The pressure on both sides being equal, any change in the rate of flow of steam or in the static pressure in the outlet will decrease or increase the pressure on the upper side of the diaphragm a proportional amount, an increase in the flow causing a reduction of pressure on the diaphragm, as will also a decrease in the static pressure, while a decrease in the rate of flow or an increase of static pressure will cause an increase of pressure on the upper side of the diaphragm.

The diaphragm 1 is connected by a rod 11 passing diametrically through the diaphragm to the arms of a lever 12 which is partially mounted at $12^a$ and has its outer end adjustably connected to a pivotally mounted beam 13. A bell crank lever 14 is pivotally mounted on this beam and has an arm connected to the stem 15 of the pilot valve 16 which may be of any suitable construction, while the other arm of the bell crank is connected by a link 17 to a pivotally mounted post 18. When the beam is shifted by the diaphragm, the bell crank will move with it and thereby shift the movable member of the valve mechanism 16 which is connected through port $16^a$ to any suitable source of fluid under pressure and admit pressure to one end of the cylinder 19 to move its piston which is connected by the rod 20 to the frame 21. One of the legs of this frame has a block 22 secured thereto, said block having therein a groove for the reception of a bar 23 which is pivotally mounted on the upper end of the pivotally supported post 18. This bar can be adjusted to any desired angle to the axis of the cylinder 19 so that by any desired movement of the frame, a swinging post may be moved sufficiently to so shift the bell crank lever 14 as to close the pilot valve which has been opened by the movement of the diaphragm. It is characteristic of the construction employed that for each movement of the diaphragm an incremental movement will be imparted to the frame 21.

The frame 21 is connected to a pivotally mounted arm 24 having a connection through a link 25 to the movable member of a valve mechanism, which is preferably of the construction shown and described in Letters Patent No. 1,247,217, dated November 20th, 1917, Francis H. Brown. As shown and described in said patent, the movable member consists of a cylinder having ports or openings adapted to be moved into alinement with ports in the valve shell both by a longitudinal and a rotary movement of the cylindrical member. In the arrangement shown herein, which is substantially similar to the construction shown in Figs. 2, 7, and 8 of said patent, the arm 24 is connected to the stem 26 of the cylindrical shell 27, so that by the movement of the frame 21, as hereinbefore described, the valve 27 will be moved longitudinally of the cylinder 28 to change the relative positions of the ports in the valve and those in the cylinder 28. Simultaneous with the longitudinal movement of the valve, a rotary movement is also imparted to it so as to increase or diminish the extent of alinement of the ports in the valve and cylinder respectively. While other means may be employed, the construction shown has been found preferable. An arm 29 is secured to the stem 26 of the valve and is also engaged by a block 30 slidably mounted on a bar 31 carried by the frame 32. This frame is pivotally mounted on a standard 33 in order that the frame and bar 31 may be adjusted to an angular position relative to the valve stem 26. When the stem 26 is moved longitudinally by the arm 24, the block 30 will be moved along the angularly arranged bar, whereby a rotary movement will be imparted to the valve 27, the extent of such rotary movement for a given longitudinal movement being dependent on the angularity of the bar 31.

When employing the described mechanism in the practice of the invention, a damper or valve 34 arranged in the conduit 35 for the escape of gases and products of combustion, is so connected to the frame 21 as to be moved toward open or closed positions on the movement of the frame by an amount proportional to the incremental movement of the frame. The connection between the valve and damper can be formed by a cord 35ª having one end secured to one end of the frame and after passing around suitably arranged guide pulleys 36 and one or more turns around a drum 37 on the shaft of the valve or damper, has its opposite end also connected to a weight or to the lower end of the frame 21.

Air is forced through a conduit 38 to a point anterior to the bed of fuel by a blower 39 operating at a uniform rate as shown in Fig. 2, the motor being directly connected to the boiler by a pipe 40. The flow of air through the conduit is regulated by a valve or damper 41, which is operatively connected by a cord 42 to the piston rod 43 of a fluid pressure cylinder 44 which in turn is controlled by and in accordance with changes of pressure of gases in the portion of the fire-box posterior to the bed of fuel. The mechanism preferably employed for controlling the operation of the fluid pressure motor 44, is diagrammatically indicated at 45, is shown in Fig 4 of Patent No. 1,150,097, dated August 17, 1915, Francis H. Brown. As shown and described in said patent, changes of pressure of gases in the firebox cause an up or down movement of an inverted cup immersed in water or other liquid, and said cup is connected by suitable means to a valve mechanism controlling the flow of steam or other fluid under pressure to the cylinder 44.

The feed of fuel is controlled by the roto-reciprocating valve 27, its inlet port being connected by the pipe 40 to the boiler or other suitable source of fluid under pressure and its outlet port connected by the pipe 47 to the motor of the stoking mechanism indicated at 48.

As hereinbefore stated, when the mechanism is adjusted for normal conditions the pressures on the under side of the diaphragm 1 is equal to the normal working pressure in the generator and the pressure above the diaphragm is equal to the static pressure in the inlet pipe minus the reduction due to the rate of flow of steam through such pipe, and the damper and stoking mechanism are adjusted to maintain normal combustion conditions. In case of changes of rate of flow due to changes in the load on the engine, or from any other cause, the diaphragm 1 will be moved by or against the constant or substantially constant pressure of the fluid pressure cushion and thereby shift the pilot valve. By reason of the arrangement of the Pitot tube the dynamic pressure on the diaphragm will not exceed the predetermined constant pressure. The movement of the frame 21 following the shifting of the pilot valve will not be total but only for a predetermined increment of its total range, as the pilot valve will be closed by the described mechanism, only at the end of the predetermined increment. The shifting of the frame 21 will effect a corresponding incremental opening or closing movement of the damper 34 controlling the outflow of gases and products of combustion. The shifting of the damper 34 will cause a decrease or increase of pressure in the fire box and such change in pressure operating through the mechanism indicated at 45 will cause an incremental opening or closing of the damper or valve 41 in the air supply conduit 38 in the forms shown in Figs. 2 and 3. The described movement of the frame 21 will effect a movement of the roto-reciprocating valve controlling the operation of the stoking mechanism, to increase or decrease the rate of feed of fuel.

While it is believed that entire dependence may be had on regulating the operations involved in maintaining desired generating conditions, on regulation as effected by and in accordance with the flow of steam, it is possible that as the rate of flow is not affected by the static pressure, but the latter is affected by the rate of flow, when the rate of generation varies from the demand, the latter may be so great relative to the rate of generation that the static pressure will drop, hence provision is made for regulating the operations of feeding fuel and air and regulating the outflow of gases from the furnace by and in accordance with changes of static pressure of the steam in the outlet pipe. To this end, the means, as for example, the Pitot-tube 4ª, employed for varying the pressure on the diaphragm by and in accordance with the rate of flow of steam from the boiler, is so constructed and arranged in the outlet pipe 4 that the static pressure on the diaphragm will be decreased by the flow, such decrease being approximately proportional to the rate of flow.

It will be readily understood that if the Pitot tube should be so arranged in the outlet pipe, that the total pressure would be increased as the flow increased, and the mechanism operated and controlled by the diaphragm were adjusted to bring about increased combustion when pressure on the diaphragm, due to greater flow, increased, then a decrease in static pressure, the flow being constant, would permit of the diaphragm being shifted by the constant pressure of the fluid pressure cushion, and the operation of the mechanism controlled by the diaphragm would be reversed or so operated as to reduce combustion in the fire box at a time when increased combustion is required. But by providing for the shifting of the diaphragm in the same direction by a change of pressure, whether such changes are due to variations in flow or to variations in static pressure, the rate of combustion will be regulated to compensate in the same direction for variations in flow and in static pressure.

In Figs. 1, 3 and 4 are shown the modifications as regards the control of combustion operations by and in accordance with the rate of flow of steam in the outlet pipe and also by and in accordance with variations in static pressure of the steam. As for example, in Fig. 1 the position of the stack damper 34 is controlled by and in accordance with variations in the elements forming the total pressure in the outlet pipe, as hereinbefore described, but in lieu of controlling the flow of air to a point anterior to the fuel bed by and in accordance with the pressure of gases in the furnace, such flow is controlled by the rote-reciprocating valve whose outlet pipe 47 is connected not only to the stoking mechanism as shown in Fig. 2 but also to the blower mechanism 39 and hence the operation of such blower mechanism will vary as the position of the valve mechanism is changed, and the valve mechanism is shifted by and in accordance with changes in dynamic pressure in the outlet pipe 4.

In Fig. 3 is a shown a combination in which the stack damper 34 is controlled as hereinbefore described, and the flow of air to a point anterior to the fuel bed is controlled by and in accordance with the pressure of gases in the furnace, but in lieu of controlling the stoking mechanism directly in accordance with variations in dynamic pressure in the outlet pipe, such control is effected by and in accordance with changes of pressure of gases in the furnace, and to this end the stem 26 of the movable member of the roto-reciprocating valve is connected to the piston rod 43 of the fluid pressure cylinder 44 of the mechanism 45 by a cord 46. As the lever 24 forming the operating connection between the frame 21 and the movable member of the roto-reciprocating valve mechanism is omitted, the position of the movable member of this valve mechanism will be determined by the mechanism 45 subjected to the pressure of gases in the furnace.

In Fig. 4 is shown a combination controlling the rate of combustion under natural draft conditions. As shown in Figs. 1, 2, and 3, the frame 21 is connected by a cord 35ª to the damper 34 in the outlet conduit 35 so that the escape of gases from the furnace will be controlled by and in accordance with variations in the dynamic pressure of the steam in the outlet pipe 4. The stoking mechanism 48 is controlled as hereinbefore described, by the roto-reciprocating valve, the movable member of which is shiftable longitudinally by the frame 21 as shown in Figs. 1 and 2.

I claim herein as my invention:

1. As an improvement in the art of generating vapor, the method herein described which consists in supplying fuel to the fire box of the generator, supplying air for combustion, conducting away the products of combustion, and adjusting one of the foregoing operations by and in accordance with changes in the static pressure of the vapor and by and in accordance with changes in pressure resulting from the static pressure in a boiler diminished by and in accordance with changes in the rate of flow of vapor from the generator.

2. As an improvement in the art of generation of vapor, the method herein described which consists in supplying fuel to the fire box of the generator, supplying air for combustion, conducting away the products of combustion and varying the rate of flow of the gases and products of combustion from the furnace of the boiler by and in accordance with changes in the static pressure of the vapor and by and in accordance with changes in pressure resulting from static pressure of a vapor in a boiler diminished by and in accordance with changes in the rate of flow of vapor from the boiler.

3. As an improvement in the art of generating vapor, the method herein described which consists in supplying fuel to the fire box of the generator, supplying air for combustion, conducting away the products of combustion and varying the escape of products of combustion from the furnace of the boiler and the flow of air to a point anterior to the bed of fuel in the furnace by and in accordance with changes in a pressure resulting from static pressure diminished by and in accordance with the rate of flow of vapor from the boiler and by and in accordance with changes from the normal static pressure in the boiler.

4. As an improvement in the art of generating vapor, the method herein described which consists in supplying fuel to the fire box of the generator, supplying air for combustion, conducting away the products of combustion and varying the feed of fuel to the furnace of the boiler and the flow of products of combustion from the boiler by and in accordance with changes in a pressure resulting from static pressure diminished by and in accordance with the rate of flow of vapor from the boiler.

5. As an improvement in the art of generating vapor, the method herein described which consists in supplying fuel to the fire box of the generator supplying air for combustion, conducting away the products of combustion and varying the rate of flow of gases and products of combustion from the furnace of a boiler by and in accordance with changes in a pressure resulting from static pressure diminished by and in accordance with the rate of flow of vapors from the boiler and varying the feed of air to the furnace by and in accordance with changes of pressure of gases in the furnace.

6. As an improvement in the art of generating vapor, the method herein described which consists in supplying fuel to the fire box of the generator supplying air for combustion, conducting away the products of combustion and varying the escape of products of combustion from and the feed of air and fuel to the furnace of the boiler by and in accordance with changes in a pressure resulting from static pressure diminished by and in accordance with changes in the rate of flow of vapor from the boiler.

7. As an improvement in the art of generating vapor, the method herein described which consists in supplying fuel to the fire box of the generator, supplying air for combustion, conducting away the products of combustion and varying the escape of products of combustion from the furnace and feed of fuel to the furnace of the generator by and in accordance with changes in a pressure resulting from static pressure diminished by and in accordance with changes in the rate of flow of vapor from the boiler and varying the feed of air to the furnace by and in accordance with the pressure of gases in the furnace.

8. In an apparatus for the generation of vapor, the combination of a boiler having a furnace, means for feeding fuel to the furnace, means for supplying air for combustion to the furnace, means for controlling the flow of products of combustion from the fire box of the boiler, means operative by and in accordance with the changes in the static pressure of the steam and by and in accordance with changes in a pressure resulting from static pressure in a boiler diminished by and in accordance with changes in the rate of flow of steam flowing from the generator for adjusting one of the foregoing means.

9. In an apparatus for the generation of vapor, the combination of a boiler having a furnace, means for feeding fuel to the furnace, means for supplying air for combustion to the furnace, means for controlling the flow of products of combustion from the fire box of the boiler and mechanism for adjusting the means employed for controlling the flow of gases and products of combustion by and in accordance with changes in the static pressure of the steam and by and in accordance with changes in a pressure resulting from static pressure diminished by and in accordance with changes in the rate of flow of steam from the boiler.

10. In an apparatus for the generation of vapor the combination of a boiler having a furnace, means for feeding fuel to the furnace, means for supplying air for combustion to the furnace, means for controlling the flow of products of combustion from the firebox of the boiler and means operative by and in accordance with changes in the normal static pressure of steam in the boiler and by and in accordance with a pressure resulting from the static pressure in the boiler diminished by and in accordance with changes in the rate of flow of vapor from the boiler for adjusting the means controlling the escape of products of combustion and the means controlling the flow of air to the furnace.

11. In an apparatus for the generation of vapor the combination of a boiler having a furnace, means for feeding fuel to the furnace, means for supplying air for combustion to the furnace, means for controlling the flow of products of combustion from the firebox of the boiler and means operative by and in accordance with changes in the normal static pressure of steam in the boiler and by and in accordance with a pressure resulting from the static pressure in the boiler diminished by and in accordance with changes in the rate of flow of vapor from the boiler for regulating the feed of fuel to the furnace of the generator and the flow of products of combustion from the furnace.

12. In an apparatus for the generation of vapor the combination of a boiler having a furnace, means for feeding fuel to the furnace, means for supplying air for combustion to the furnace, means for controlling the flow of products of combustion from the fire box of the boiler and means operative by and in accordance with changes in the normal static pressure of steam in the boiler and by and in accordance with a pressure resulting from the static pressure in the boiler diminished by and in accordance with changes in the rate of flow of vapor from the boiler for regulating the means controlling the flow of gases from the furnace and the flow of air and the feed of fuel to the furnace and means operative by and in accordance with the changes of pressure of gases in the furnace for adjusting the air feeding means.

In testimony whereof I have hereunto set my hand.

THOMAS A. PEEBLES.